(12) United States Patent
Lamb et al.

(10) Patent No.: US 11,552,440 B2
(45) Date of Patent: Jan. 10, 2023

(54) LASER

(71) Applicant: LEONARDO MW LIMITED, Basildon (GB)

(72) Inventors: Robert Lamb, Basildon (GB); Ian Elder, Basildon (GB)

(73) Assignee: LEONARDO UK LTD, London (GB)

(*) Notice: Subject to any disclaimer, the term of this patent is extended or adjusted under 35 U.S.C. 154(b) by 19 days.

(21) Appl. No.: 16/761,103

(22) PCT Filed: Nov. 2, 2018

(86) PCT No.: PCT/EP2018/080067
§ 371 (c)(1),
(2) Date: May 1, 2020

(87) PCT Pub. No.: WO2019/086639
PCT Pub. Date: May 9, 2019

(65) Prior Publication Data
US 2020/0358239 A1 Nov. 12, 2020

(30) Foreign Application Priority Data
Nov. 2, 2017 (GB) .................................. 1718212

(51) Int. Cl.
*H01S 3/02* (2006.01)
*H01S 3/06* (2006.01)
(Continued)

(52) U.S. Cl.
CPC ............ *H01S 3/025* (2013.01); *H01S 3/0606* (2013.01); *H01S 3/0608* (2013.01); *H01S 3/083* (2013.01);
(Continued)

(58) Field of Classification Search
CPC ...... H01S 3/063; H01S 3/025; H01S 3/08045; H01S 3/083; H01S 3/06791;
(Continued)

(56) References Cited

U.S. PATENT DOCUMENTS 4,317,089 A * 2/1982 Grant, Jr. ............. G01C 19/661
372/103
4,665,529 A 5/1987 Baer et al.
(Continued)

FOREIGN PATENT DOCUMENTS

EP 1687873 B1 4/2008
EP 3704769 A1 9/2020
(Continued)

OTHER PUBLICATIONS

RP Photonics Encyclopedia (www.rp-photonics.com/waveguide), filed on Nov. 2, 2011). (Year: 2011).*
(Continued)

*Primary Examiner* — Tod T Van Roy
*Assistant Examiner* — Delma R Fordé
(74) *Attorney, Agent, or Firm* — Buchanan Ingersoll & Rooney PC

(57) ABSTRACT

A laser is disclosed having a housing formed of a block of glass-ceramic. The block is machined (or otherwise formed) to define one or more channels that act as a waveguide in two dimensions for light within the laser resonator. The channels extend between cavities also formed within the block which retain optical components of the laser, e.g. one or more of the gain medium, cavity mirrors, intermediate reflectors etc. The positioning, shape and size of each cavity is bespoke for the optical component it holds in order that each optical component is retained in optical alignment rigidly against the sides of the cavity.

17 Claims, 6 Drawing Sheets

(51) Int. Cl.
  *H01S 3/08* (2006.01)
  *H01S 3/083* (2006.01)
  *H01S 3/11* (2006.01)
  *H01S 3/16* (2006.01)

(52) U.S. Cl.
  CPC ...... *H01S 3/08018* (2013.01); *H01S 3/08059* (2013.01); *H01S 3/11* (2013.01); *H01S 3/1611* (2013.01); *H01S 3/1643* (2013.01)

(58) Field of Classification Search
  CPC .... H01S 3/0627; H01S 3/0608; H01S 3/0835; H01S 3/0606; H01S 3/136
  See application file for complete search history.

(56) References Cited

U.S. PATENT DOCUMENTS

| | | | |
|---|---|---|---|
| 4,731,795 A | 3/1988 | Clark et al. | |
| 4,751,716 A * | 6/1988 | Ream | H01S 3/16 372/35 |
| 4,993,034 A * | 2/1991 | Aoki | H01S 3/063 372/40 |
| 5,181,223 A | 1/1993 | Baer et al. | |
| 5,410,625 A | 4/1995 | Jenkins et al. | |
| 5,412,681 A | 5/1995 | Eisel et al. | |
| 5,708,675 A * | 1/1998 | Moon | H01S 3/0608 372/103 |
| 2005/0129083 A1 | 6/2005 | Wilson et al. | |
| 2006/0227841 A1* | 10/2006 | Savich | H01S 3/0608 372/69 |
| 2007/0041418 A1 | 2/2007 | Laughman et al. | |
| 2007/0097491 A1 | 5/2007 | Mcnie et al. | |
| 2008/0304052 A1* | 12/2008 | Mitchell | G01C 19/665 359/507 |
| 2010/0290626 A1 | 11/2010 | Jenkins et al. | |
| 2020/0295520 A1* | 9/2020 | Boyd | H01S 3/08054 |
| 2020/0358239 A1 | 11/2020 | Lamb et al. | |

FOREIGN PATENT DOCUMENTS

| | | |
|---|---|---|
| JP | S62274788 A | 11/1987 |
| JP | S6327079 A | 2/1988 |
| WO | 2019086639 A1 | 5/2019 |

OTHER PUBLICATIONS

First Office Action dated Jul. 6, 2021, by the Japanese Patent Office in corresponding Japanese Patent Application No. 2020-524362, and an English Translation of the Office Action. (5 pages).

Office Action (Examination Report 2) dated Apr. 19, 2021, by the Australian Patent Office in corresponding Australian Patent Application No. 2018361538 (5 pages).

Office Action (Notification of Reason for Refusal) dated Apr. 14, 2021, by the Korean Patent Office in corresponding Korean Patent Application No. 10-2020-7014763, and an English Translation of the Office Action. 47 pages).

International Search Report (PCT/ISA/210) dated Feb. 20, 2019, by the European Patent Office as the International Searching Authority for International Application No. PCT/EP2018/080067.

Written Opinion (PCT/ISA/237) dated Feb. 20, 2019, by the European Patent Office as the International Searching Authority for International Application No. PCT/EP2018/080067.

Office Action dated Jan. 28, 2015, by the Canadian Patent Office in corresponding Canadian Patent Application No. 3,076,880. (3 pages).

Office Action (Notice of Deficiencies) dated Sep. 22, 2022, by the Israeli Patent Office in corresponding Israeli Patent Application No. P-594128-IL. (5 pages).

* cited by examiner

LASER

The present invention relates to a novel design of laser.

U.S. Pat. No. 5,412,681A relates to a slab-waveguide CO2 laser which includes two parallel, rectangular, flat, spaced-apart electrodes whose surfaces excite a laser gas and guide laser light in a plane perpendicular to the surfaces of the slab electrodes.

The following publication discloses an optical circuit in which the light is guided using hollow waveguides formed in a monoblock: Jenkins, R. M., Perrett, B. J., McNie, M. E., Finlayson, E. D., Davies, R. R., Banerji, J. and Davies, A. R., "Hollow optical waveguide devices and systems," Proc. SPIE 7113, 71130E (2008); and Ian F Elder, Daniel H. Thorne, Robert A Lamb and R Mike Jenkins, Mid-IR laser source using hollow waveguide beam combining, Proc SPIE 972601, 2016.

US2007/0041418 describes a slab $CO_2$ laser having a waveguide formed between two layers of BeO. The waveguide has two purposes. First its 'Z' shape allows the physical length of the laser to be shorter. Second, the relatively small cross-section area of the waveguide, compared with a conventional slab laser, improves heat transfer to the walls allows the discharge to run cooler.

According to an aspect of the invention there is provided a laser comprising: a gain medium, resonator mirrors, a pump mechanism to activate the gain medium, and a hollow waveguide; wherein the hollow waveguide is arranged between the gain medium and at least one of the resonator mirrors to guide laser light from the medium to at least one of the resonator mirrors.

The waveguide preferably confines the laser light about two orthogonal planes (e.g. a vertical plane and horizontal plane) on each side of the optical axis. As such the waveguide may be a substantially enclosed, namely that it has a substantially closed cross-sectional shape as taken through a plane transverse to the optical axis.

The waveguide may be selected (e.g. has cross-sectional dimensions), according to the operating wavelength of the laser, to preferentially select the lowest order mode ($TEM_{00}$) by suppressing higher order modes so as to provide a higher quality output beam compared with propagating the light within the resonator through free space or a light pipe.

The sectional shape of the waveguide, as viewed along the optical axis may be of any suitable shape; non-limiting examples include circular, square and rectangular.

The laser may comprise multiple hollow waveguides that guide between optical components (e.g. mirrors, prisms, polarisers, phase plates) within the laser's resonator. Multiple hollow waveguides may extend between reflectors (e.g. prisms and/or mirrors) within the resonator cavity in order to provide a meandering path for light between the resonator mirrors.

A meandering path allows for a relatively long resonator length whilst minimising the overall physical length (footprint) of the laser.

A long resonator length provides a long optical path that ensures a low Fresnel number and subsequently good output beam quality, i.e. the energy (power) of the beam is at least predominately in the lowest order mode.

In addition, long resonator lengths may be used to provide relatively long pulse durations e.g. of the order of 15 ns-22 ns, when used with pulsing means such as, for example, Q switching.

The hollow waveguide may be closed at one end by a resonator mirror. It may be partially or fully closed at the other end by a second resonator mirror.

The hollow waveguide may be defined at least in part by a conduit formed in a body. The body may be substantially solid. The body may be in block form, e.g. a monobloc.

The body may define one or more conduits (e.g. formed in the solid body) that provide multiple hollow waveguides that guide light within the resonator. Additionally or alternatively, the body may define multiple conduits that provide multiple waveguides. The body may define a cavity that retains an optical component that manipulates (e.g. one or more of amplifies, reflects, splits, focuses, disperses, phase shifts) the light within the resonator. The use of a solid body that defines waveguides and supports optical components in individual cavities provides greater mechanical rigidity compared with use of traditional laser designs that uses multiple mounts to support optical components within a hollow container.

The cavity may be positioned and shaped to support and retain the optical component in a position that provides the desired optical alignment. This avoids the need for optical mechanical mounts and manual adjustment or alignment. Favourably the optical component is retained against the cavity walls by a precision milled fit.

The body may define a cavity to retain at least one of the resonator mirrors.

Favourably the body comprises multiple cavities for retaining multiple optical components of the laser; e.g. the body may comprise two cavities each arranged to retain a resonator mirror. Most favourably the body comprise cavities to support and retain all of the optical components of the laser.

Example optical components include one or more of: mirrors, prisms, Q switch, phase shifters, retarders, polarisers, wave plates & lenses.

The conduit may extend between cavities to guide light between the optical components held in those cavities.

The body may comprise a single integral piece that defines, at least in part, the conduit and at least one cavity.

The body may comprise first and second pieces that cooperate to define the one or more conduits and/or recesses. The first piece may be provided with, e.g. define, a channel. The second piece may provide one or more sides of the conduit, e.g. close an open side of the channel of the first piece, e.g. with a flat side, or comprises a second channel that cooperates with the channel of the first piece, so as to define the waveguide.

The first piece may be a single integral piece. The second piece may be a single integral piece. Alternatively, the body may be formed as a single integral piece in which the one or more conduits are formed.

The conduits and/or cavities may be formed using a suitable manufacturing process. Non-limiting examples include computer numerical control (CNC) milling of a block, and/or additive manufacturing.

In an arrangement in which the conduits are defined within a single integral piece body, additive manufacture may be a more suitable manufacturing process. The optical components may then be inserted into the part-formed body during manufacture before the remainder of the body is formed around the optical components so as to retain them.

The body may be made from a glass, glass-ceramic and/or other ceramic material; non-limiting examples include Macor™, AlSi and SiN; or a metal, e.g. copper and/or gold. The body may comprise a substrate (e.g. non-metallic) having a metallic coating, e.g. Macor™ coated with copper and/or gold. The choice of material chosen may be based on the required mechanical rigidity and brittle fracture of the body for the laser's intended application, and/or the operational wavelength of the laser. A body comprised of metal or metal coated substrate may provide reduced loss of light for propagation along the waveguide (compared with a non-metallic body). The metal chosen will depend on the intended operating wavelength of the laser.

The hollow waveguide may provide substantially the entire optical path between the gain medium and the resonator mirror, most preferably such that the light does not propagate in free space within the resonator.

The cross-sectional width (plane transverse to the optical axis) of the waveguide is selected based on the operational wavelength of the laser using design principles that are well known in the art.

The gain medium may be any known form; however, solid or static forms may be preferred as they are self contained and so lend themselves to being retained in the cavity of the body. An example gain media is Nd:YAG that is used for lasers operative at a wavelength about 1064 nm.

The gain medium may be mounted in the body. For example the gain medium may be mounted within a conduit of the body that provides one or more of the waveguides.

The body has, favourably defines, multiple conduits to provide multiple hollow waveguides that lie between the gain medium and a resonator mirror, and the laser comprises one or more reflectors to direct light between the conduits. This allows the optical path between the resonator mirrors to take a meandering form. This arrangement avoids losses that would be associated using a coiled fibre to provide a meandering optical path.

The reflector may comprise a prism and/or turning mirrors to direct the light between the conduits. The reflectors may be retained in a cavity within the body.

The body may define a conduit that provides a waveguide or other path for laser light outputted from the laser's resonator.

The body may define one or more cavities for holding one or more additional optical components of an optical circuit that manipulates laser light that is outputted from the laser's resonator. One or more conduits of the body (or further conduits defined by the body) may provide one or more waveguides to guide light outputted from the laser's resonator to/between the additional optical components of the optical circuit. As such the laser may form part of an integrated optical circuit.

In one non-limited example, an optical circuit may provide a combiner that combines that outputs of multiple hollow waveguide lasers of the variously afore-described design.

The invention was conceived for IR operative lasers but the inventive concept may be applied to lasers operating at other wavelengths including but not limited to visible, MWIR and LWIR.

In another aspect there is provided an optical circuit comprising a body defining hollow conduits that provide waveguides for guiding light travelling about the optical circuit, and in which one or more of the hollow conduits and/or further hollow conduits in the body provide a waveguide of the laser as variously described above.

According to another aspect of the invention there is provided a laser comprising: a gain medium, resonator mirrors, a pump mechanism to energise the gain medium and a waveguide; wherein the waveguide is arranged between the gain medium and at least one of the resonator mirrors to guide light between the gain medium towards at least one of the resonator mirrors; the laser comprising a body that defines a conduit that defines the waveguide, and a recess in which one or more of the gain medium and resonator mirrors are seated.

The invention may also be described in terms of a method and therefore according to another aspect of the invention there is provided a method of manufacturing a laser comprising providing a first single integral piece body defines at least part of each of: two cavities; and a conduit that extends between the cavities; the conduit, when the laser is in use, acting as a waveguide for light between the cavities; and the method comprises arranging optical components that make up the laser by locating a first optical component of the laser in one of the two cavities and a further optical component of the laser in a second of the two cavities.

The first single integral piece body may be manufactured using a machining process and/or an additive manufacture process.

The method may include bringing together the first single integral piece with a second single integral piece, the first and second integral pieces cooperating to define a conduit that acts as a waveguide which, when the laser is in use, confines laser light about two orthogonal planes on each side of the optical axis. The second integral piece may define a side of the cavity.

The cavity is favourably positioned and shaped to support and retain the optical component in optical alignment. The optical component may be retained directly against a wall of the cavity.

The method may comprise locating a first mirror providing a first end of a resonator of the laser in one of the two cavities and locating a second mirror providing a second end of the resonator of the laser in a second of the two cavities.

In another aspect there is provided a method of manufacturing an optical circuit comprising in addition to the method of manufacturing a laser variously described above, locating a further optical component in a further cavity of the single integral piece which, when the circuit is in operation, manipulates laser light that has been outputted from a resonator of the laser.

The invention will now be described with reference to the figures in which:

FIG. 5 is a perspective view of the laser of FIG. 4 shown with lid on.

Figure 1:
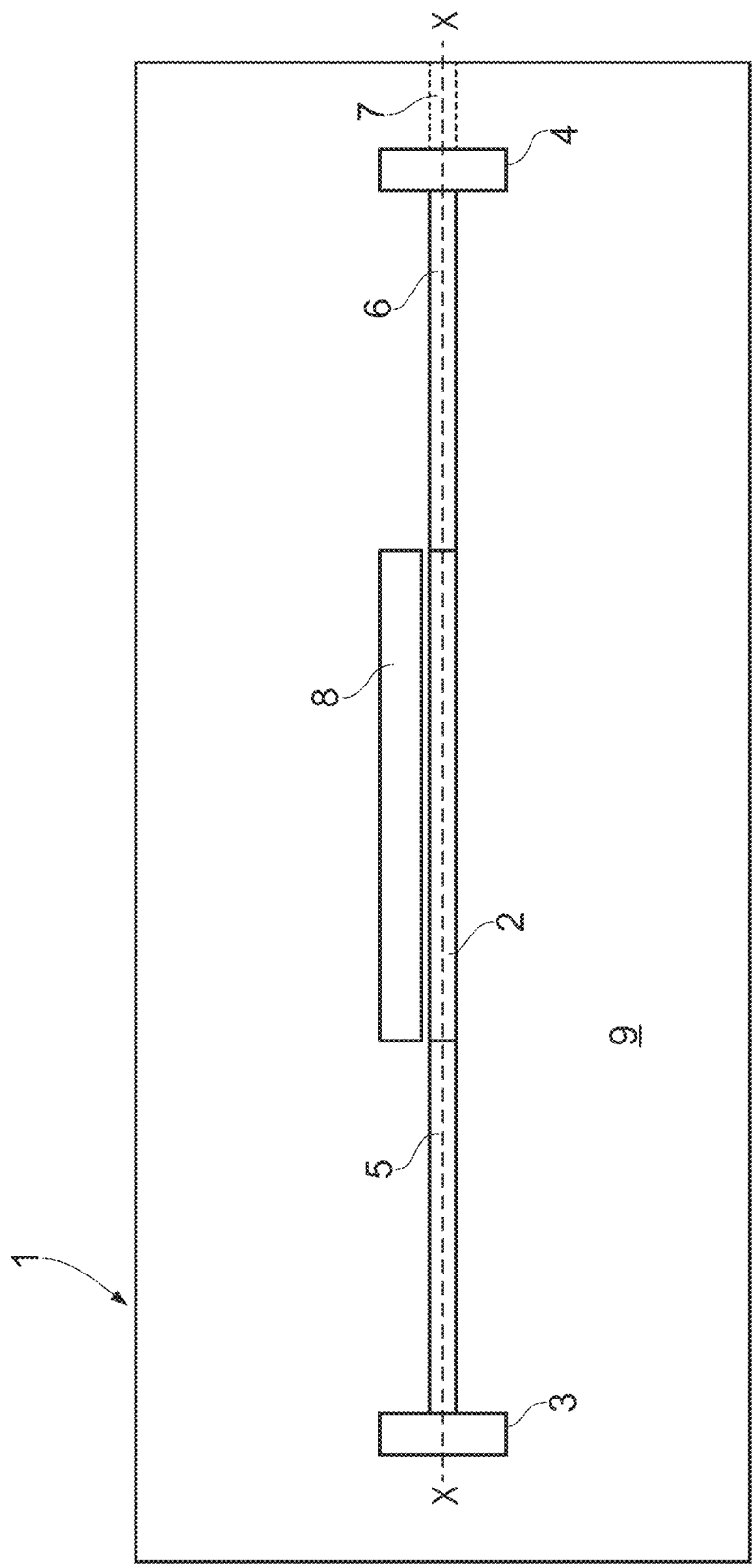
FIG. 1 is a plan schematic view of a laser comprising a hollow waveguide shown without lid.
Figure 2:
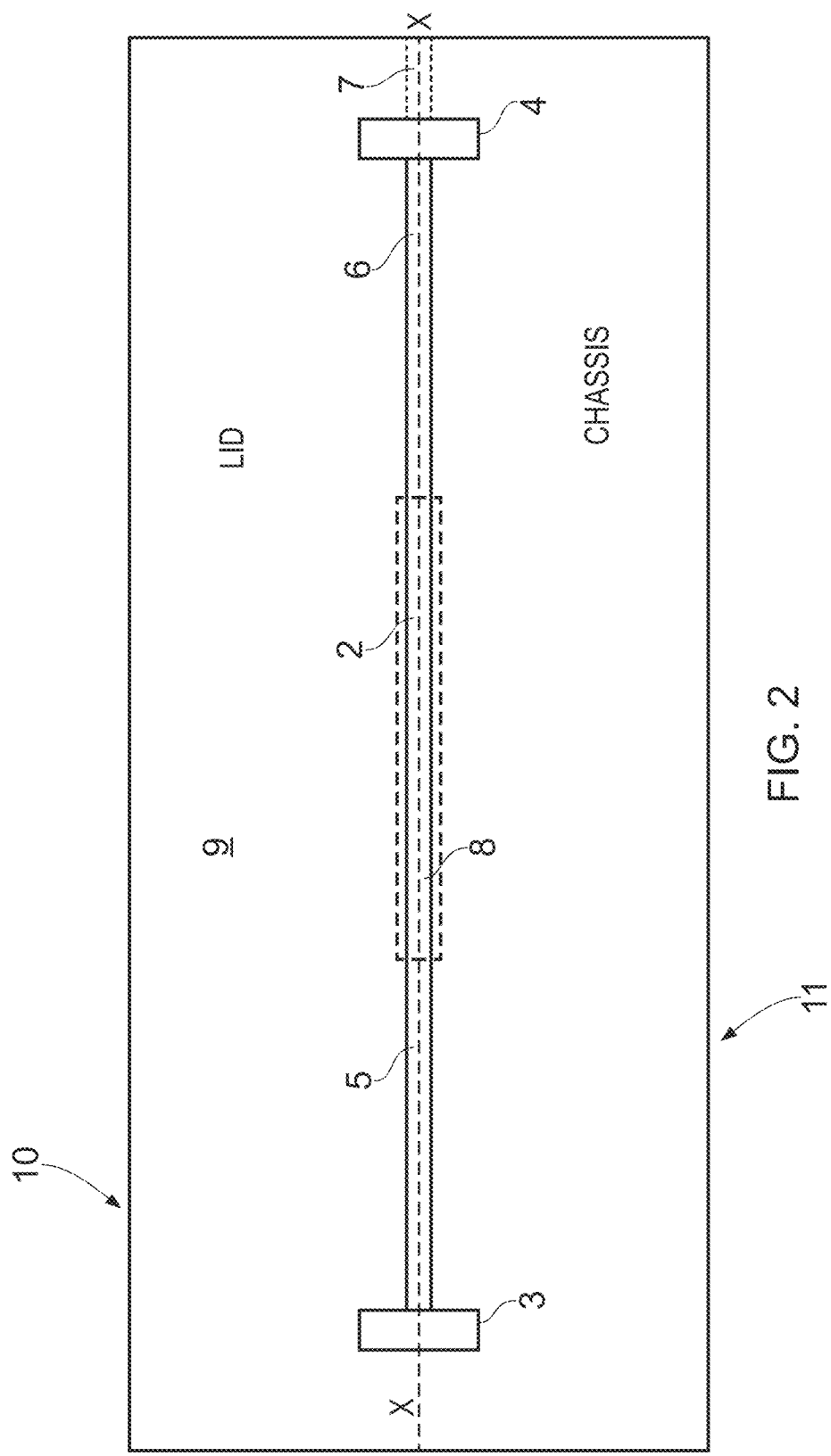
FIG. 2 is a side schematic section view of the laser FIG. 1 shown with lid.
Figure 3:
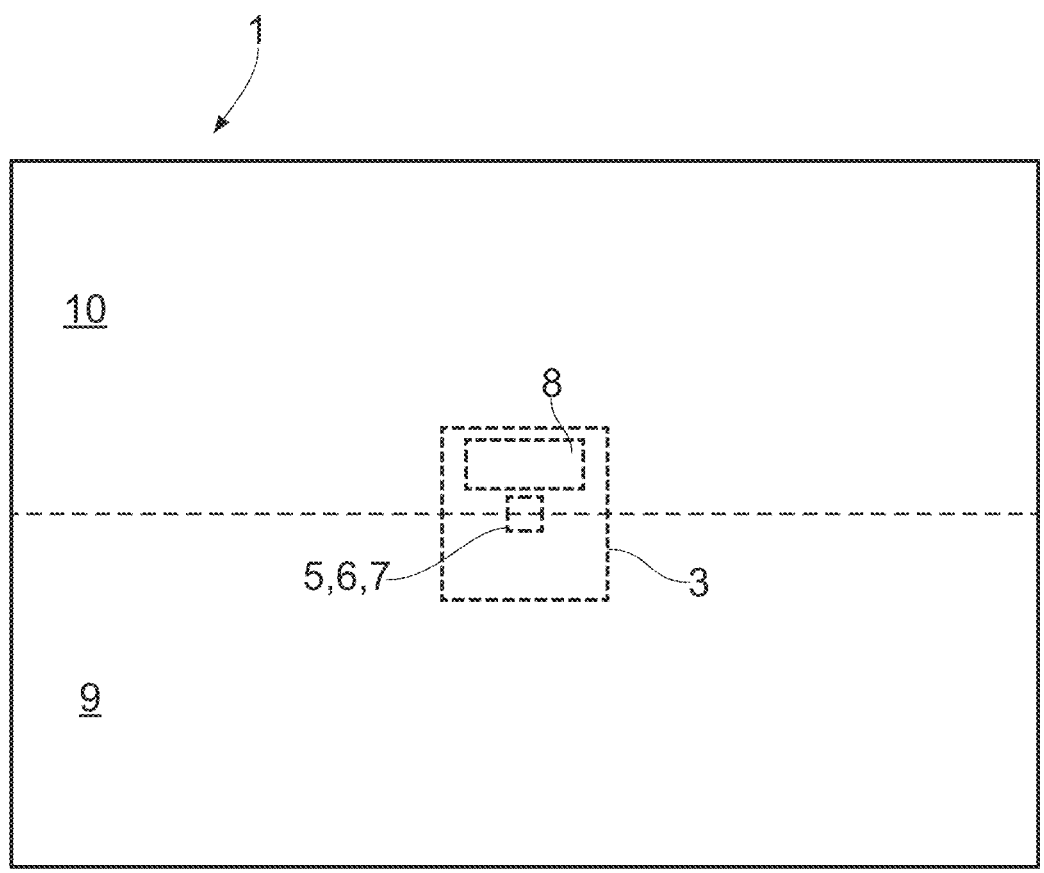
FIG. 3 is an end schematic section view of the laser of FIG. 1 shown with lid looking along the optical axis.

FIGS. 1 to 3 illustrate a laser 1, having a laser gain medium 2 arranged between a first end resonator mirror 3 and second end resonator mirror 4; the latter being partially reflective so as to provide an output from the laser's 1 resonator that is formed between the resonator mirrors 3, 4. The laser 1 further comprises a first hollow waveguide 5 that guides light between the gain medium 2 and the first end resonator mirror 3, a second hollow waveguide 6 that guides light from the gain medium 2 to the second end resonator mirror 4, and a third hollow waveguide 7 that guides light transmitted through the output mirror 4 to provide an output port of the laser 1. The laser gain medium 2 is energised by a pump mechanism 8.

The laser 1 comprises a chassis 9 formed from a single integral solid piece (monobloc), e.g. of Macor or other suitable material. The monobloc is milled, e.g. using a CNC process, to define a hollow channel that provides three sides of the first, second and third waveguides 5, 6, 7, and recesses for retaining mirrors 3 and 4 and pump mechanism 8. A portion of the channel also acts to retain (seated in) the laser gain medium 2. The laser 1 comprises a lid 10 also formed as a monobloc arranged to lie against chassis 9 to close the channels providing the waveguides 5, 6, and 7 of square cross section (see FIG. 3) so as to enclose around the optical axis X-X of the light within the resonator.

The lid 10 may be profiled to provide a channel and/or recesses that correspond with the channel and recesses of the chassis 9 to provide a portion of the channel.

The channel may have other cross section shapes.

The dimensions of the width and length of the channel are chosen such that the Fresnel number is commensurate with an output beam that is predominantly $TEM_{00}$, i.e. the lowest mode which is a preferred beam characteristic for many applications.

The recesses are preferably shaped, sized and positioned such that the optical components are retained rigidly (i.e. without play) in the desired optical alignment. Nevertheless, though less preferred, the recesses may be adapted to additionally hold alignment means to allow the optical component to be moved within the recess to allow the component to be aligned manually.

The pump mechanism may be of any known form suitable for use with the gain medium chosen.

Figure 4:
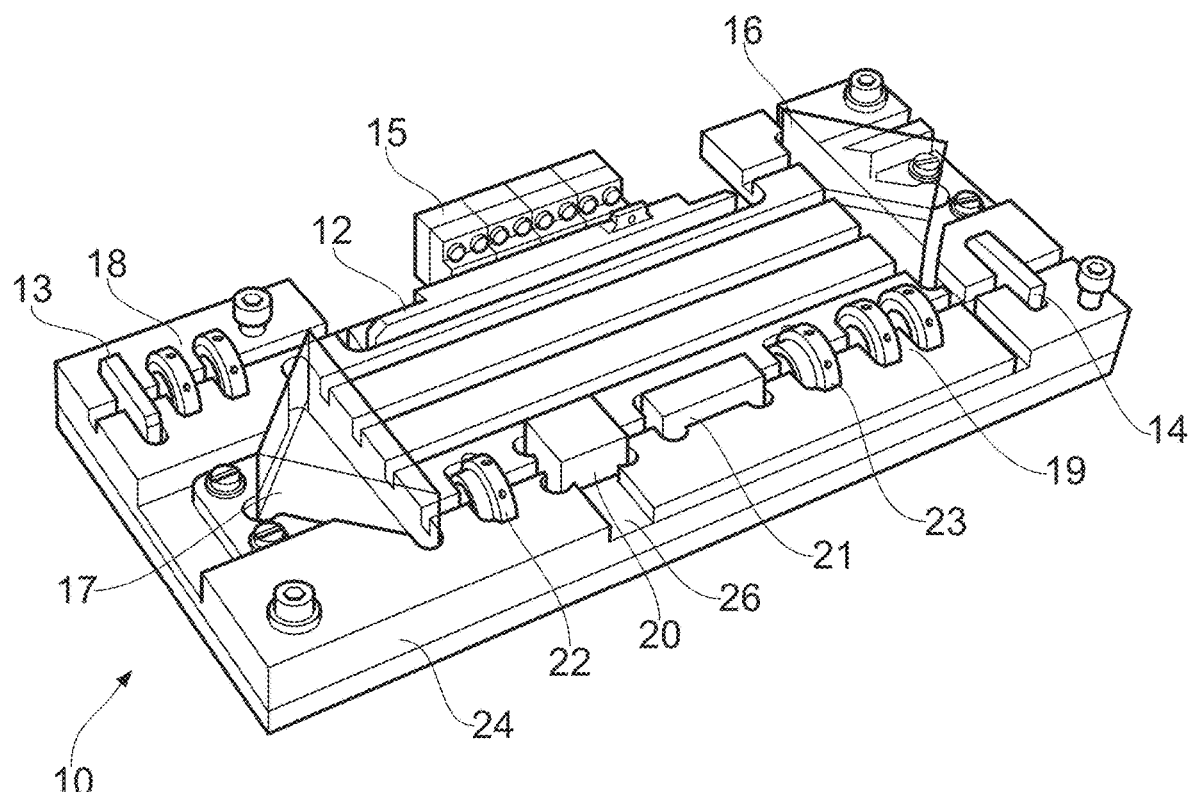
FIG. 4 is a perspective view of a second embodiment of laser with lid absent to show optical layout.

FIG. 4 is a variant embodiment of hollow waveguide laser 10 shown without lid so that the optical layout is visible. The laser 10 comprises a laser gain crystal 12 arranged optically between a first end resonator mirror 13 and a second end resonator mirror 14; a pump mechanism 15 to energise the laser gain crystal 12; a first reflecting prism 16; a second prism 17, a first pair of matched wedged prisms (also known as Risley prisms) 18, a second pair of matched wedged prisms 19; a polarising beam splitter 20; a Q switch 21; a half wave plate or quarter plate 22, and a quarter wave plate 23.

A hollow waveguide extends between each of the optical components above (except pump 15) to provide a meandering optical pathway that extends between the resonator mirrors 13 and 14.

The laser 10 comprises a chassis 24 and lid 25 (see FIG. 5) each formed as a monobloc of glass-ceramic such as, for example, Macor™ (though materials other than glass ceramic may be used). The chassis 24 is milled to provide channels that define portions of the hollow waveguides and recesses in which the resonator mirrors 13, 14 prisms 16, 17, beam splitter 20, Q switch 21 and plates 23, 23 are seated and retained in optical alignment with the optical pathway. In this embodiment, the laser gain crystal 12 is positioned within a cut out provided in the chassis 24; however, it may instead be retained within a channel through the chassis 24. The chassis 24 also comprises a broad channel 26 that provides an output port of the laser 10 from the beam splitter 20.

Light entering either the first or second prisms 16, 17 is reflected back and forth therebetween three times (though could be more or less) travelling through a separate hollow waveguide each time. The meandering optical path allows for containment of a long resonator length in a laser having a physically short footprint.

The functions of the wedged prisms 18, 19, plates 22, 23, Q switch 21, beam splitter 20 are well known and so will not be described in further detail. It will be appreciated that each of these components are optional.

Although not preferred, a portion of the optical pathway between the resonator mirrors may extend through free space; e.g. as a result of a gap between the gain medium and the hollow waveguide.

Figure 5:
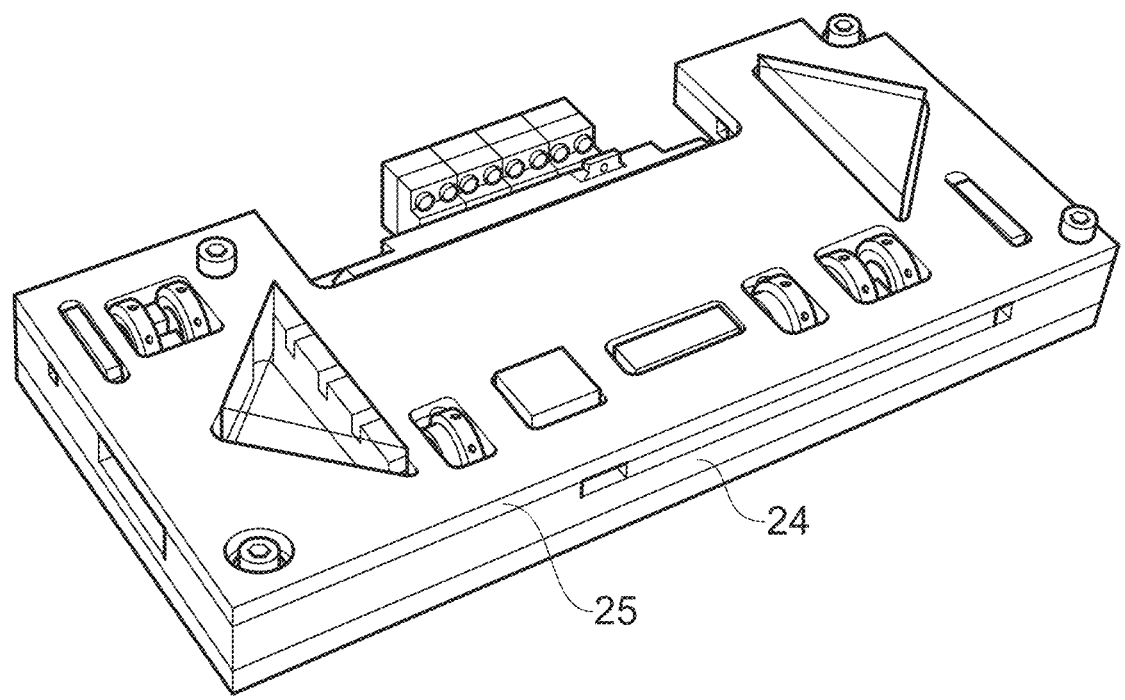

As illustrated in FIG. 5 the lid 25 may be comprised with through holes through which optical components may extend. This is optional. In an alternative arrangement the lid may completely contain the components.

Figure 6:
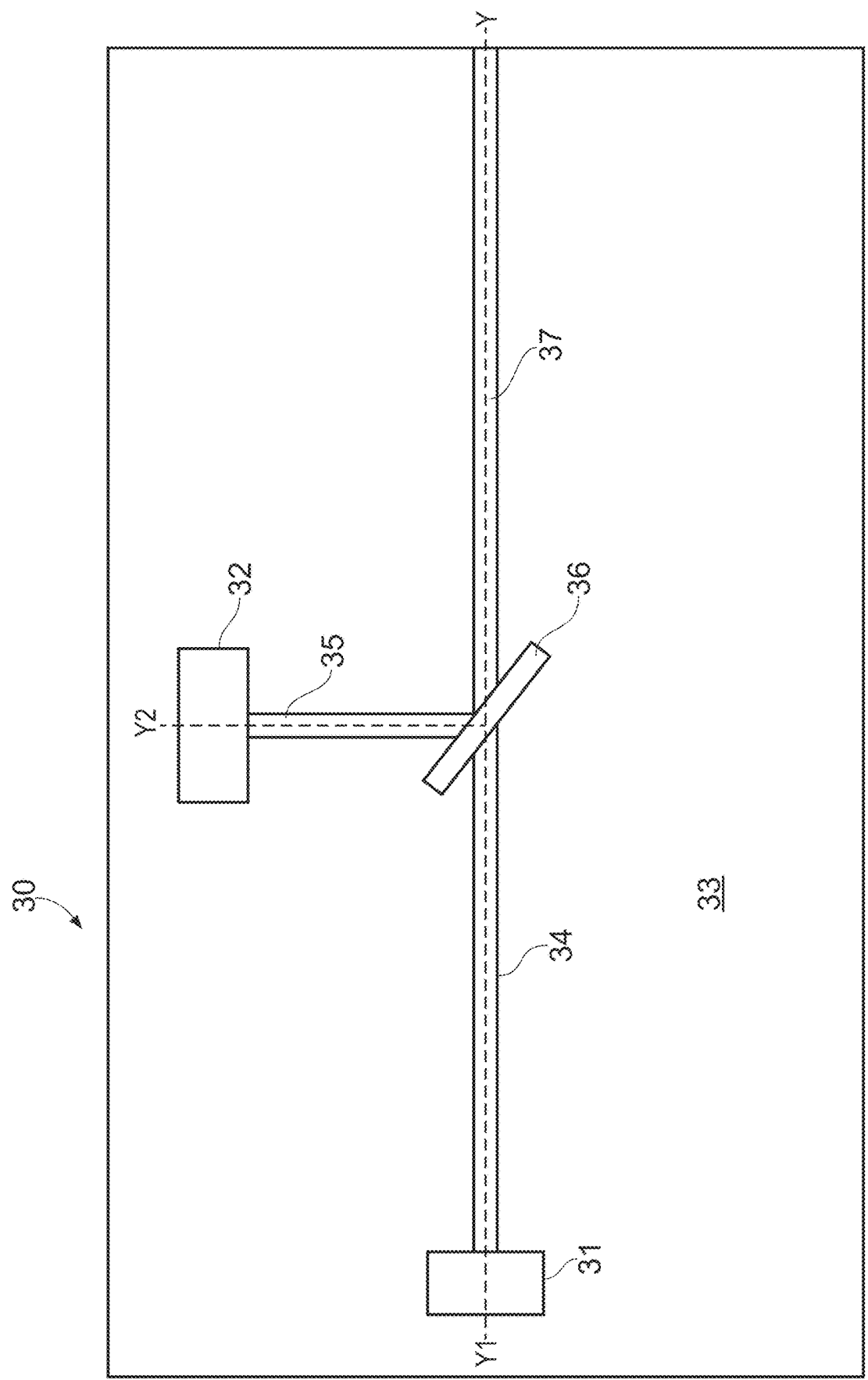
FIG. 6 is schematic of an optical circuit comprising multiple hollow waveguide lasers and a beam combiner the lasers and combiner circuitry being integrated into a single body.

FIG. 6 is a schematic of an optical circuit 30 that functions as a beam combiner. The circuit 30 comprises two hollow waveguide lasers 31, 32 both of which are formed on a chassis 33 provided by a single integral piece (e.g. monobloc). In addition to the channels and recesses used to provide the waveguides and hold the optical components of the hollow waveguide laser 31, 32, the chassis 33 defines further channels, which together with a lid (not shown), provide enclosed hollow waveguides 34, 35 that guide laser outputs (though may not be formed to suppress propagation of modes higher than $TEM_{00}$) from the respective lasers 31, 32 to a beam combiner component 36. The combined output from the beam combiner 36 is contained within a hollow waveguide 37 (also provided by a channel formed in the chassis 33) on a single beam axis. The form of the beam combiner 36 will depend on whether the wavelengths of the outputs from the lasers 31, 32 are the same or different. Either way the form of the beam combiner is conventional to those skilled in the art. It will be appreciated that in a variant embodiment more than two lasers may be formed on the chassis 22.

It will be appreciated that alternative optical circuits could be arranged to provide additional or alternative functions. For example an integrated optical circuit including an integrated laser could be used to provide the optical circuitry of a LIDAR system.

The above embodiments illustrate linear resonators though the conduits of the body may equally be arranged to provide a ring resonator.

Although less preferred, rather than block form the chassis could be plate like, the plate material having approximately equal thickness across is width and length and profiled to define the conduits and recesses such as to resemble in form, a vacuum moulded piece.

The invention claimed is:

1. A laser comprising:
   a gain medium;
   resonator mirrors;
   a pump mechanism configured to energise the gain medium and a hollow waveguide;
   wherein the hollow waveguide is arranged between the gain medium and at least one of the resonator mirrors to guide light between the gain medium and at least one of the resonator mirrors, the laser including a single integral piece body that:
   defines one or more conduits that provide, at least in part, the hollow waveguide, and
   includes one or more cavities to retain the resonator mirrors; and
   wherein cross-sectional dimensions of the hollow waveguide are configured to select a beam that is predominantly at lowest order $TEM_{00}$ mode, that extends substantially the entire distance between the gain medium and the at least one resonator mirrors.

2. A laser according to claim 1, wherein the single integral piece body defines multiple conduits configured to provide multiple waveguides that lie between the gain medium and the resonator mirrors, and the laser comprises:
a reflector to direct light between the conduits.

3. A laser according to claim 1, wherein the body defines a further cavity that retains an optical component configured to manipulate light within a resonator of the laser.

4. A laser according to claim 3, wherein the cavity is shaped and sized to retain the optical component in optical alignment.

5. A laser according to claim 3, wherein the single integral piece body comprises:
one or more cavities to retain one or more of the gain medium and reflector.

6. A laser according to claim 1, comprising:
a Q switch, the Q switch being retained in a further cavity provided by the single integral piece body so that light travelling through the hollow waveguide provided in the body will be incident upon the hollow waveguide.

7. A laser according to claim 1, wherein the conduit, or a further conduit defined by the body, is configured to guide a laser light output from the laser.

8. An optical circuit comprising:
a body having hollow conduits that provide waveguides configured for guiding light travelling about the optical circuit, wherein at least one or more of the hollow conduits, or further conduits, in the body are configured to provide the hollow waveguide for the laser of claim 1.

9. An optical circuit according to claim 8, wherein the body comprises:
a monolith in which a channel configured to provide the conduits is formed.

10. A method of manufacturing a laser comprising:
providing a first single integral piece body that defines at least part of each of:
two cavities; and
a conduit that extends between the cavities, the conduit, when the laser is in use, acting as a hollow waveguide for light between the cavities, wherein the hollow waveguide provides an optical path, with cross-sectional dimensions which preferentially select a beam with the lowest order mode, that extends substantially the entire distance between a gain medium and at least one resonator mirrors; and
locating a first optical component of the laser in one of the two cavities and a further optical component of the laser in a second of the two cavities.

11. A method according to claim 10, comprising:
manufacturing the first single integral piece body by at least one of a machining process or an additive manufacture process.

12. A method according to claim 10, comprising;
bringing together the first single integral piece with a second single integral piece, the first and second integral pieces cooperating to define a conduit that acts as a waveguide which, when the laser is in use, confines laser light about two orthogonal planes on each side of the optical axis.

13. A method according to claim 12, wherein the second integral piece defines a side of at least one of the cavities.

14. A method according to claim 10, wherein at least one of the cavities is positioned and shaped to support and retain at least one of the optical components in optical alignment.

15. A method according to claim 14, wherein at least one of the optical components is retained directly against a wall of at least one of the cavities.

16. A method according to claim 11, comprising:
locating a first mirror providing a first end of a resonator of the laser in one of the two cavities and locating a second mirror providing a second end of the resonator of the laser in a second of the two cavities.

17. A method of manufacturing an optical circuit comprising, in addition to the method of claim 10:
locating a further optical component in a further cavity of the single integral piece which, when the circuit is in operation, manipulates light that has been outputted from the laser.

* * * * *